(12) United States Patent
Chong

(10) Patent No.: US 9,503,251 B2
(45) Date of Patent: Nov. 22, 2016

(54) METHOD AND APPARATUS FOR MITIGATION OF BASELINE WANDER ON AN AC COUPLED LINK

(71) Applicant: Euhan Chong, Ottawa (CA)

(72) Inventor: Euhan Chong, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/603,605

(22) Filed: Jan. 23, 2015

(65) Prior Publication Data

US 2016/0218854 A1 Jul. 28, 2016

(51) Int. Cl.
| H04B 3/00 | (2006.01) |
| H04L 7/00 | (2006.01) |
| H04L 7/033 | (2006.01) |
| H04B 3/54 | (2006.01) |

(52) U.S. Cl.
CPC ............... *H04L 7/0012* (2013.01); *H04B 3/54* (2013.01); *H04L 7/0337* (2013.01)

(58) Field of Classification Search
CPC .......... H04L 25/0272; H04L 25/0292; H04M 11/06
USPC .................................. 375/257, 222
See application file for complete search history.

(56) References Cited

U.S. PATENT DOCUMENTS

| 5,847,548 | A * | 12/1998 | He ......................... H02M 1/34 323/222 |
| 6,646,982 | B1 * | 11/2003 | Chengson ........... H04L 25/0272 370/217 |
| 6,946,986 | B2 * | 9/2005 | Gabillard ............. G11C 27/026 341/150 |
| 7,961,817 | B2 * | 6/2011 | Dong ...................... H04L 25/06 327/307 |
| 8,326,255 | B2 | 12/2012 | Ullen et al. |
| 2004/0217797 | A1 | 11/2004 | Cao et al. |
| 2008/0061857 | A1 * | 3/2008 | Kapusta .................. H03F 3/005 327/337 |
| 2008/0156982 | A1 | 7/2008 | Casper |
| 2012/0133414 | A1 * | 5/2012 | Zhuang ............ H03K 3/356113 327/333 |
| 2012/0133459 | A1 * | 5/2012 | Zhuang .................... H04B 3/14 333/28 R |
| 2016/0173299 | A1 * | 6/2016 | Islam ................ H04L 25/03057 375/233 |

OTHER PUBLICATIONS

Gangasani et al., "A 32 Gb/s Backplane Transceiver with On-Chip AC-Coupling and Low Latency CDR in 32 nm SOI CMOS Technology," IEEE Journal of Solid-State Circuits, Aug. 6, 2014, pp. 2474-2489, vol. 49, Issue 11.

(Continued)

*Primary Examiner* — Helene Tayong

(57) ABSTRACT

Methods and apparatus for mitigating baseline wander in an AC coupled transmission line are provided. An apparatus includes an input node, an output node, a sampling circuit and a level-shifting output circuit. The input and output nodes couple the apparatus in parallel with a high-pass filter of the transmission line. The sampling circuit samples an input voltage at the input node. The level-shifting output circuit delivers a level-shifted version of the input voltage to the output node. The apparatus may include a first pair of synchronized switches, a second pair of synchronized switches, and a sampling capacitor therebetween. The switches are driven periodically with concurrent closure of the two pairs of switches inhibited. The sampling capacitor couples between a signal input and a reference node upon closure of the first pair of switches, and between a bias voltage and a signal output upon closure of the second pair of switches.

22 Claims, 9 Drawing Sheets

(56) References Cited

OTHER PUBLICATIONS

Johnson, H., "When to Use AC Coupling," High Speed Digital Design Online Newsletter, Nov. 13, 2001, pp. 1-3, vol. 4, Issue 15, https://www.sigcon.com/Pubs/news/4_15.htm.
Johnson, H., "DC Blocking Capacitor Value," High Speed Digital Design Online Newsletter, Jan. 10, 2005, pp. 1-9, vol. 7, Issue 9, https://www.sigcon.com/Pubs/news/7_09.htm.
Zhuang, Jingcheng et al., Linear Equalization and PVT-Independent DC Wander Compensation for AC-Coupled PCIe 3.0 Receiver Front End, IEEE Transactions on Circuits and Systems-II: Express Briefs, May 2011, pp. 289-293, vol. 58, No. 5.
International Search Report for International Application No. PCT/CN2015/096703 mailed Mar. 9, 2016.

* cited by examiner

METHOD AND APPARATUS FOR MITIGATION OF BASELINE WANDER ON AN AC COUPLED LINK

CROSS-REFERENCE TO RELATED APPLICATIONS

This is the first application filed for the present invention.

FIELD OF THE TECHNOLOGY

The present technology pertains to the field of electronic circuits and in particular to circuitry and methods for mitigation of baseline wander associated with an AC coupled data communication link, such as a high-speed serial link.

BACKGROUND

AC coupled data communication links are useful for example in applications where the capability of accommodating different DC bias or common mode voltages for transmitting and receiving circuits is desired. A common approach to implementing AC coupled links is to place a series-connected AC coupling capacitor, also referred to as a AC blocking capacitor, along the transmission line path between transmitting and receiving circuits to act as a high-pass filter.

However, such AC coupled data links can be susceptible to a phenomenon known as DC or baseline wander. For example, when a significantly unbalanced number of binary 'ones' and 'zeros' are transmitted over an AC coupled link, a voltage droop can occur at the receiver side of the AC coupling capacitor. Such signals include a significant low-frequency or DC component that is blocked by the AC coupling capacitor. Voltage droop can accumulate over time and affect the vertical margin on the received signal and hence the link margin.

For example, the paper "A 32 Gb/s Backplane Transceiver with On-Chip AC-Coupling and Low Latency CDR in 32 nm SOI CMOS Technology," Gangasani et al., IEEE Journal of Solid-State Circuits, 2014, discusses the use of on-chip AC coupling capacitors in order to eliminate impedance discontinuities and signal quality degradation associated with on-board AC coupling capacitors. However, the small sizes of such on-chip capacitors is recognized as a potential source of baseline wander, in which long runs of 'ones' or 'zeros' can induce a transient shift on the low-frequency component of the received signal after the AC-coupling capacitors, which can degrade the receiver sensitivity.

Various solutions for mitigating DC wander have been proposed in the literature. For example, several solutions such as "Decision-Feedback Restore" and "Passive Feed-Forward Restore" are discussed in the above-mentioned paper by Gangasani et al. However, these and other solutions can require large resistive or capacitive filter components, relatively high circuit complexity, performance limitations and trade-offs, and the like.

Therefore there is a need for a circuit apparatus for mitigating DC wander in an AC coupled link that is not subject to one or more limitations of the prior art.

This background information is provided to reveal information believed by the applicant to be of possible relevance to the present technology. No admission is necessarily intended, nor should be construed, that any of the preceding information constitutes prior art against the present technology.

SUMMARY

An object of the present technology is to provide apparatus and methods for mitigation of baseline wander associated with an AC coupled link. In accordance with an aspect of the present technology, there is provided an electronic circuit apparatus which includes a first pair of synchronized switches, a second pair of synchronized switches, and a sampling capacitor circuit coupled between the pairs of switches. The first pair of switches is configured to alternatingly open and close in response to a first clock signal variation, while the second pair of switches is configured to alternatingly open and close in response to a second clock signal variation. Concurrent closure of the first pair of synchronized switches with the second pair of synchronized switches can be inhibited. The sampling capacitor circuit is configured to couple between a signal input and a reference node upon closure of the first pair of switches. Further, the sampling capacitor circuit is configured to couple between a source of bias voltage and a signal output upon closure of the second pair of switches.

In accordance with another aspect of the present technology, there is provided an electronic circuit apparatus which includes an input node, an output node, a sampling circuit and a level-shifting output circuit. The apparatus may be connected to an AC coupled data transmission line and may be used for mitigating baseline wander associated therewith. The input node and the output node couple the apparatus in parallel with a high-pass filter of the AC coupled transmission line, such that the input node is coupled to a signal input side of the high-pass filter and the output node is coupled to a signal output side of the high-pass filter. The sampling circuit is configured to sample an input voltage at the input node. The level-shifting output circuit is configured to receive the sampled input voltage from the sampling circuit and to generate and deliver an output voltage at the output node, for example in a generally feed-forward manner, such that the output voltage corresponds to a level shifted version of the input voltage.

In accordance with yet another aspect of the present technology, there is provided a method for facilitating signal coupling across a high-pass filter of an AC coupled data link. The method may be used for example for mitigating baseline wander associated with the AC coupled data link. The AC coupled data link includes a high-pass filter separating a receiver portion of the AC coupled link from a transmitter portion of the AC coupled link. The method includes sampling an input voltage at the transmitter portion using a first circuit portion. The method further includes delivering an output voltage at the receiver portion using a second circuit portion operatively coupled to the first circuit portion, such that the output voltage corresponds to a level shifted version of the input voltage.

In accordance with yet another aspect of the present technology, there is provided an integrated circuit apparatus configured for operative coupling to additional circuitry through use of an AC coupled data transmission line. The integrated circuit includes a circuit having an input node, an output node, a sampling circuit and a level-shifting output circuit. The circuit may be referred to as a baseline wander mitigation circuit in various embodiments. The input node and the output node couple the apparatus in parallel with a high-pass filter of the AC coupled transmission line, such that the input node is coupled to a signal input side of the high-pass filter and the output node is coupled to a signal output side of the high-pass filter. The sampling circuit is configured to sample an input voltage at the input node. The level-shifting output circuit is configured to receive the sampled input voltage from the sampling circuit and to generate and deliver an output voltage at the output node, such that the output voltage corresponds to a level shifted version of the input voltage.

BRIEF DESCRIPTION OF THE FIGURES

Further features and advantages of the present technology will become apparent from the following detailed description, taken in combination with the appended drawings, in which.

It will be noted that throughout the appended drawings, like features are identified by like reference numerals.

DETAILED DESCRIPTION

Definitions

As used herein, the term "switch" refers to an electrical component that is controllable to alternatingly complete or break an electrical circuit from a functional standpoint. Appropriate switches may include solid state switches such as transistor-based switches, such as switches implemented by a FET transistor switched by application of appropriate gate voltages. Microelectromechanical system (MEMS) switches, or the like, as would be readily understood by a worker skilled in the art. While schematic diagrams herein may, for convenience, represent a switch by a traditional mechanical symbol, this should not be construed as limiting to the type or functional particulars of the switch in use. Furthermore, the concepts of "open switch" and "closed switch" may denote the concepts of substantially conducting and substantially non-conducting operation, respectively, rather than necessarily denoting physical opening and closure. Indeed, switches operating in the appropriate frequency range, such as the megahertz range, are expected to be solid state switches in typical implementations.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this technology belongs.

The present technology provides circuitry and associated methods which may be used for applications such as mitigation of baseline wander associated with an AC coupled data link, such as a serial data transmission link, using a level-shifting feed-forward circuit. The AC coupled link incorporates a high-pass filter, such as an AC coupling capacitor, separating a signal input side of the link from a signal output side. The circuitry operates in parallel with the high-pass filter and samples or otherwise monitors the signal input side and manipulates the signal output side in a corresponding manner.

AC coupled data links may be used to communicate serial data at high speeds between chips, modules, backplanes, and the like. Such data links may operate in the 25 Gb/sec to 32 Gb/sec range, for example, and may be used to integrate components of various electrical equipment including but not limited to wireless transceivers, high-speed communication equipment, and the like.

Figure 1:
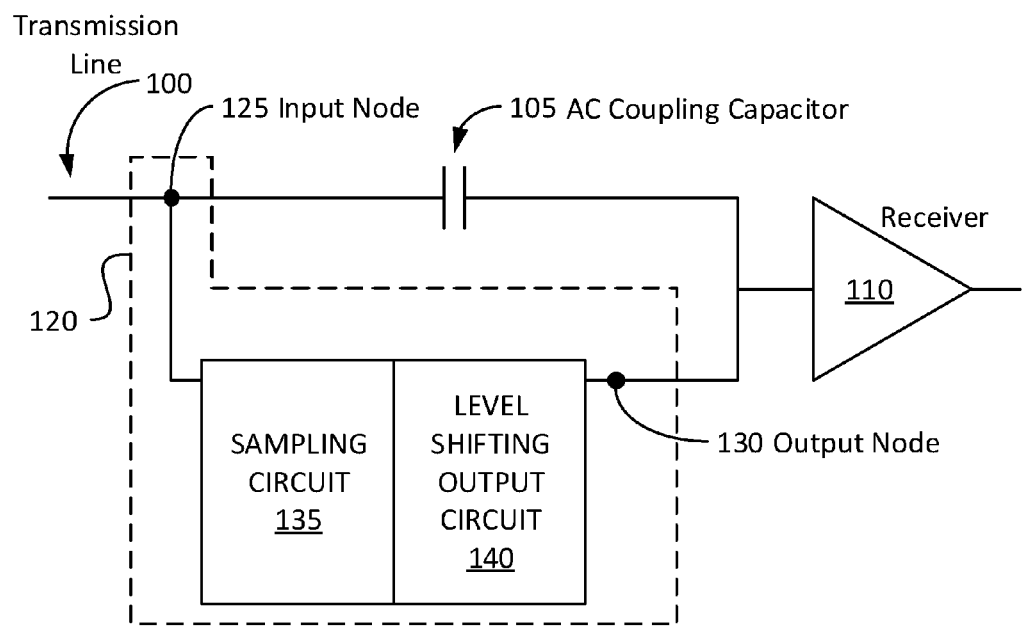
FIG. 1 illustrates an electronic circuit apparatus provided in accordance with embodiments of the present invention.

FIG. 1 schematically illustrates a circuit 120 provided in accordance with embodiments of the present invention. An AC coupled data transmission line 100, which may be one of two transmission line components operating as a differential pair, is connected by way of an AC coupling capacitor 105 to a data receiver 110. The AC coupling capacitor 105 is one example of a high-pass filter, although other types of filters may conceivably be used. The circuit 120 is coupled in parallel with the AC coupling capacitor 105, such that an input node 125 is coupled to a signal input side of the AC coupling capacitor 105 and an output node 130 is coupled to a signal output side of the AC coupling capacitor 105. The signal output side is opposite the signal input side and further is on the same side as the receiver 110, as illustrated.

The circuit 120 includes a sampling circuit 135 which is configured to sample or otherwise monitor or sense an input signal at the input node 125. The circuit 120 further includes a level-shifting output circuit 140, coupled to the sampling circuit and configured to receive the sampled input voltage from the sampling circuit and to generate and deliver an output signal at the output node, wherein the output signal corresponds to a level shifted version of the input signal. In various embodiments the input signal and the output signal may be voltages, and level shifting may correspond to adding a predetermined voltage to the output voltage by connecting the output voltage in series with the predetermined voltage. In some embodiments, one or more components are commonly shared by the sampling circuit 135 and the level-shifting output circuit 140. For example a sampling capacitor or other charge storage device may be part of both the sampling circuit and the level-shifting output circuit, in order to convey charge from one circuit to the other, thereby using the sampled input voltage to adjust the output voltage.

In some embodiments, receiving the sampled input voltage from the sampling circuit by the level-shifting output circuit may comprise coupling, for example via temporary closure of a switch, the two terminals of the sampling capacitor or other charge storage device to a portion of the level-shifting output circuit. The sampled input voltage held by the sampling capacitor or other charge storage device is thereby provided, via said two terminals, to the level-shifting output circuit. For example, a first terminal of the sampling capacitor may be coupled to a source of bias voltage and a second terminal may be coupled to an output of the level-shifting output circuit, thereby causing the level-shifting output circuit to receive the sampled input voltage as a series voltage introduced between the source of bias voltage and the output of the level-shifting output circuit.

Various embodiments of the present invention include a switched capacitor circuit incorporating a source of bias voltage. The bias voltage is switchably coupled in series with a sampling capacitor of the switched capacitor circuit when the circuit is coupled to the signal output side. In addition, the bias voltage is decoupled from the circuit when the signal input side is being sampled. This allows for bias voltage adjustment at the signal output side while leaving the signal input side substantially unaffected. The bias voltage can then be set, for example, to a level which corresponds with optimum performance of the receiver 110.

In various embodiments, an incoming signal on the data transmission line is sampled, for example via the sampling circuit or switched capacitor circuit, and a level-shifted version of the incoming signal is passed to the circuit output. In particular, the signal may be level-shifted to the common mode of the transmission line receiver front-end. This passage of the sampled and level-shifted signal in parallel with the AC coupling capacitor may assist in the mitigation of baseline wander.

In contrast, it is believed that a conventional feed-forward resistor, in parallel with the AC coupling capacitor and without level shifting, may result in an unacceptable and/or uncontrollable common-mode voltage at the receiver. In many implementations, it may be inadvisable to place such a resistor across the AC coupling capacitor without a circuit to independently set the common-mode voltage on the other side of the capacitor.

Figure 2:
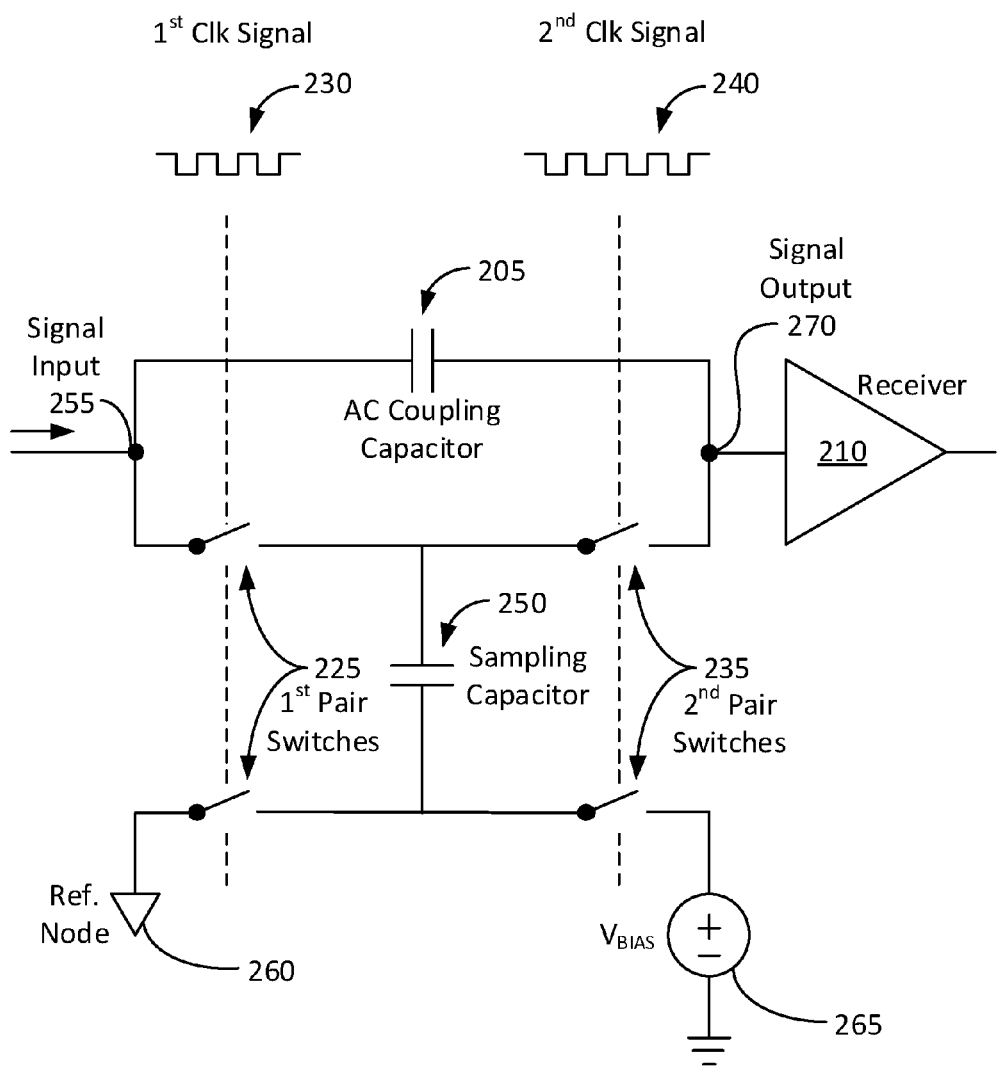
FIG. 2 illustrates an electronic circuit apparatus provided in accordance with other embodiments of the present invention.

FIG. 2 schematically illustrates a circuit provided in accordance with some embodiments of the present invention. The circuit includes a first pair of synchronized switches 225 configured to alternatingly open and close in response to a first clock signal variation 230 and a second pair of synchronized switches 235 configured to alternatingly open and close in response to a second clock signal variation 240. The first clock signal variation and the second clock signal variation may, for example, be generated by different, non-overlapping clocks, by signals derived from a common clock or other periodic signal, or by another appropriate device or method. The circuit and/or the clock signal sources may be configured such that closure of the first pair of synchronized switches concurrently with the second pair of synchronized switches is inhibited. For example, the pairs of switches can be in configurations in which both pairs of switches are open or in which one pair of switches is closed and the other pair is open, but not in the configuration in which both pairs of switches are closed. Synchronization of pairs of switches refers to each switch of the pair opening and closing at substantially the same times. It is noted that perfect synchronization may not be required for adequate functionality in all cases. For example, in some embodiments, each switch of the pair may open and close at different times, provided that both switches of the first pair are open before either switch of the second pair closes.

In various embodiments, a switch may be configured to alternatingly open and close in response to clock signal variation as follows. The switch may include three electrical terminals including a control terminal and two operating terminals, and may be configured to open when a first signal state is presented to the control terminal, and to close when a second signal state is presented to the control terminal. An open switch corresponds to relatively low electrical conductivity between the operating terminals, whereas a closed switch corresponds to relatively high electrical conductivity between the operating terminals. An example switch is a FET, with the gate corresponding to the control terminal and the source and drain corresponding to the operating terminals. An oscillating circuit termed a clock may be provided which generates a periodically varying clock signal, that is, an electrical signal which alternates between at least two states. The clock signal may be operatively coupled to the switch control terminal either directly or through an intermediate circuit, such that the signal presented to the switch control terminal varies with the clock signal. As the signal at the control terminal varies alternatingly between the first signal state and the second signal state, the switch correspondingly opens and closes. A pair of switches may be synchronized by coupling the input terminals of both switches to the same clock signal, so that both switches in the pair concurrently open and close.

In various embodiments, use of a synchronized pair of switches allows a circuit portion to be shared between two other circuits, by alternatingly coupling both terminals, such as the two terminals of a capacitor, of the circuit portion to these other circuits, for example in a periodic manner. Information may be carried by the circuit portion between the two circuits, for example in the form of charge stored in a capacitor. Further, since both terminals of the circuit portion are coupled to switches, the two circuits may be substantially isolated from each other with the exception of the information carried by the circuit portion. As such, the circuit portion, which includes an information storage component such as a capacitor, may be configured to receive and store information from a first circuit, completely decouple from the first circuit and couple to a second circuit for delivery of the stored information thereto.

Continuing now with reference to FIG. 2, the circuit further includes a sampling capacitor circuit 250 configured to couple between a signal input 255 and a reference node 260 upon closure of the first pair of switches 225. The sampling capacitor circuit 250 is further configured to couple between a source of bias voltage 265 and a signal output 270 upon closure of the second pair of switches 235.

In various embodiments, a circuit, such as a sampling capacitor circuit, may be configured to couple between a first node and a second node in the following manner. The circuit includes a first terminal and a second terminal, the first terminal being electrically connected to a first operating terminal of a first switch and the second terminal being electrically connected to a first operating terminal of a second switch. Further, a second operating terminal of the first switch is electrically connected to the first node and a second operating terminal of the second switch is electrically connected to the second node. As such, upon closure of both of the first switch and the second switch, a series electrical connection is established between the first node and the first terminal of the circuit, as well as between the second terminal of the circuit and the second node. This may potentially result in a current flowing between the first node and the second node, via the circuit. The circuit is thus considered to be electrically located between the first node and the second node. The circuit may be configured to couple between two different pairs of nodes by operation of two different pairs of switches connected to the circuit at appropriate terminals.

As illustrated, the circuit may, in operation, be coupled in parallel with an AC coupling capacitor 205 which is also connected between the signal input 255 and the signal output 270. The AC coupling capacitor 205 may be associated with an AC coupled data transmission line. The circuit may further be coupled to a receiver 210 via the circuit's signal output 270.

Thus, upon closure of the first pair of switches 225, a first side of the sampling capacitor circuit temporarily couples to the signal input 255 and a second side of the sampling capacitor temporarily couples to the reference node 260. Depending on the transmission line, the reference node 260 may correspond to an AC ground, a centre tap of a transmission line termination resistor pair, or the like. Thus, in some embodiments the sampling capacitor circuit may be configured to sample the input voltage as a voltage difference between the signal input and either an AC ground or a centre tap of a differential transmission line termination resistor pair. Charge may flow to the sampling capacitor circuit 250 during closure of the first pair of switches 225. Subsequently, upon opening of the first pair of switches 225 and closure of the second pair of switches 235, a first side of the sampling capacitor temporarily couples to the signal output 270 connected to the receiver 210, and a second side of the sampling capacitor temporarily couples to the source of bias voltage 265. Charge may flow from the sampling capacitor 250 during closure of the second pair of switches 235. Furthermore, the voltage presented at the signal output 270 relative to ground at this time substantially corresponds to the voltage across the sampling capacitor 250 added to the voltage presented by the source of bias voltage 265.

In some embodiments, the charge transfer provided for by the circuit illustrated in FIG. 2 is comparable in some respects to that of a switched capacitor resistor, as would be readily understood by a worker skilled in the art. However, in contrast to the conventional switched capacitor resistor, the output voltage is offset by an amount supplied by the source of bias voltage 265. This may be facilitated by providing the switches at both terminals of the capacitor, rather than at one terminal only. The offset amount of voltage is generally a DC voltage or slowly varying voltage, and hence is blocked by the AC coupling capacitor 205. Further, this source of bias voltage 265 is separated from the signal input 255 due to operation of the switches, for example via the non-overlapping clocks.

In various embodiments, the reference clock or clocks used to drive the switches is programmable with respect to clock frequency. In some embodiments, the reference clock frequency is set to a value between about 1 MHz and 10 MHz. Further, the AC coupling capacitor may be sized at about 1 pF, or at another value such as between about 0.5 pF and about 2 pF. Further, the sampling capacitor may be of a substantially smaller size than the AC coupling capacitor for example, between about 5 fF and 10 fF. In the case of an on-chip AC coupling capacitor, the capacitance may be made as large as possible, which with current technology provides a practical upper limit of about 1 pF, although this value is not intended to limit the present technology. The sampling capacitor and potentially the entire baseline wander mitigation circuit as described herein, or at least significant portions thereof, may also be implemented on chip.

In some embodiments, the equivalent resistance of the switched capacitor circuit, when viewed as a switched capacitor resistor, is $R=V/I=1/(C_s*f)$, where $C_s$ is the capacitance of the sampling capacitor and f is the frequency of the clock driving the switches. In further embodiments, the values $C_s$ and f may be selected so that the equivalent resistance R is greater than about 10 MΩ. That is, $1/(C_s*f)$ >10 MΩ. For example, for $C_s$=10 fF, the clock frequency f may be set at 10 MHz. Other combinations of $C_s$ and f may be implemented. In some embodiments it is desired to use a small value for $C_s$. However, in other embodiments, a larger value of $C_s$ may be used in conjunction with a lower clock rate.

In various embodiments, the bias voltage may be configured in order to set the common mode voltage seen by the transmission line receiver to a desired amount. For example, the bias voltage may be set so as to present an optimal bias voltage at the receiver. In one embodiment this optimal bias voltage is about 0.7 Volts. However, it is to be understood that the appropriate bias voltage may be receiver dependent. The desired common mode voltage seen by the receiver may be dependent on the design of the receiver in use, and may be selected in order to influence the receiver to operate in a desired region, for example away from saturation regions, in linear response regions with adequate gain and noise rejection characteristics, desired common mode rejection characteristics, and the like.

Furthermore, it is noted that, in various embodiments, the bias voltage level is effectively decoupled from the input side of the AC coupled transmission line, so that, for example, the common mode voltage of the transmitter providing a signal on the transmission line may be established independently of the bias voltage level.

Figure 3A:
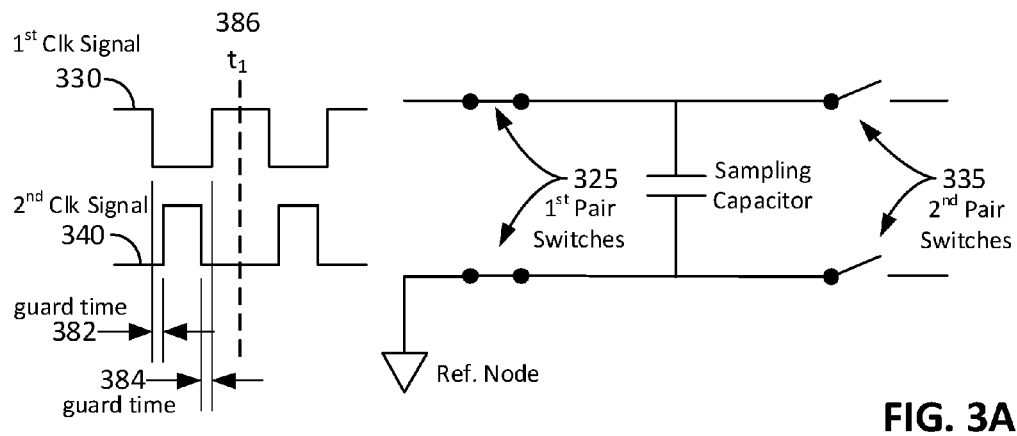
FIG. 3A illustrates aspects of operation of an electronic circuit apparatus, in accordance with embodiments of the present invention.
Figure 3B:
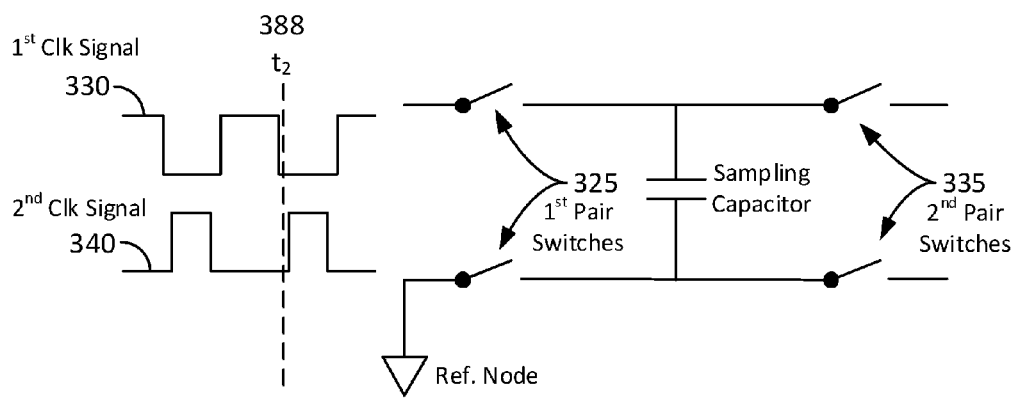
FIG. 3B illustrates aspects of operation of an electronic circuit apparatus, in accordance with embodiments of the present invention.
Figure 3C:
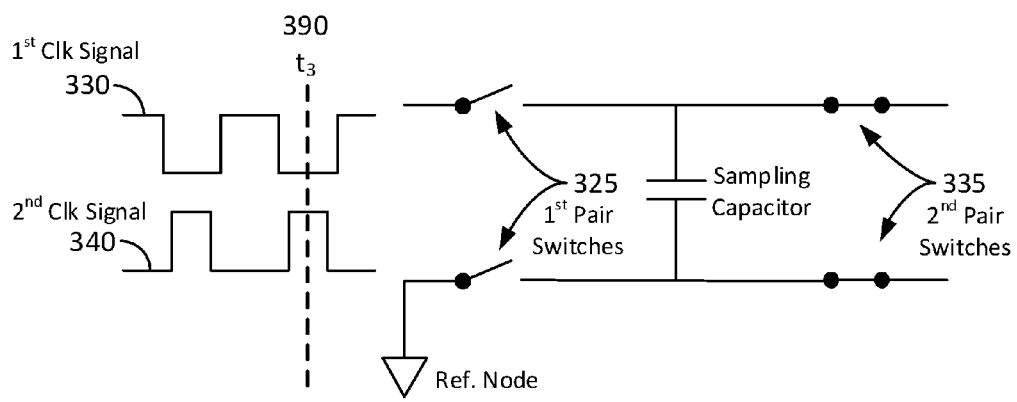
FIG. 3C illustrates aspects of operation of an electronic circuit apparatus, in accordance with embodiments of the present invention.

FIGS. 3A to 3C illustrate operation of a circuit in accordance with embodiments of the present invention. Non-overlapping clock signals 330 and 340 drive the first pair of switches 325 and the second pair of switches 335, respectively. In the present example, switches are level-triggered and close in response to a "high" level of the corresponding clock signal. As illustrated, the falling edges of the first clock signal may be separated from the subsequent rising edges of the second clock signal by a non-zero guard time interval 382, and similarly the falling edges of the second clock signal may be separated from the subsequent rising edges of the first clock signal by a non-zero guard time interval 384. FIG. 3A illustrates closure of the first pair of switches 325 concurrent with opening of the second pair of switches 335 at a first time t(1) 386. FIG. 3B illustrates opening of both the first pair of switches 325 and the second pair of switches 335 at a second time t(2) 388 falling within a guard time interval. FIG. 3C illustrates opening of the first pair of switches 325 concurrent with closure of the second pair of switches 335 at a third time t(3) 390.

Alternatively, the first and second pairs of switches may be driven by different types of clock signals, such as a single clock signal which is adapted to drive both pairs of switches in the desired manner. For example, a single triangular clock signal may be implemented which causes the first pair of switches to close only when the clock signal level rises above an upper threshold level, and which causes the second pair of switches to close only when the clock signal level falls below a lower threshold level separate from the upper threshold level. As another example, edge-triggered clocks may be used to trigger closure of the first pair of switches for a set amount of time upon a rising clock edge, and to trigger closure of the second pair of switches for a set amount of time upon a falling clock edge, the set amount of time being less than the clock pulse width.

In various embodiments, as mentioned above, the non-overlapping clocks provide for guard time intervals, such as intervals 382 and 384, during which both the first and second pairs of synchronized switches remain open following opening of one of the first and second pairs of synchronized switches and prior to closure of another of the first and second pairs of synchronized switches.

In some embodiments, when the first pair of switches and the second pair of switches are configured to alternatingly open and close in response to first and second clock signal variations, respectively, the first and second clock signal variations may be cooperatively configured to provide for the guard time interval for example by configuring the first and second clock signals as non-overlapping clock signals, as described elsewhere herein. In some embodiments, two clock signals may be cooperatively configured such that they run at substantially the same clock frequencies and are at a substantially fixed phase offset relative to each other, for example by deriving the two clock signals from a common master clock signal. In some embodiments, two clock signals may be cooperatively configured as non-overlapping clock signals by deriving each of the two clock signals differently from the common master clock signal.

Figure 4:
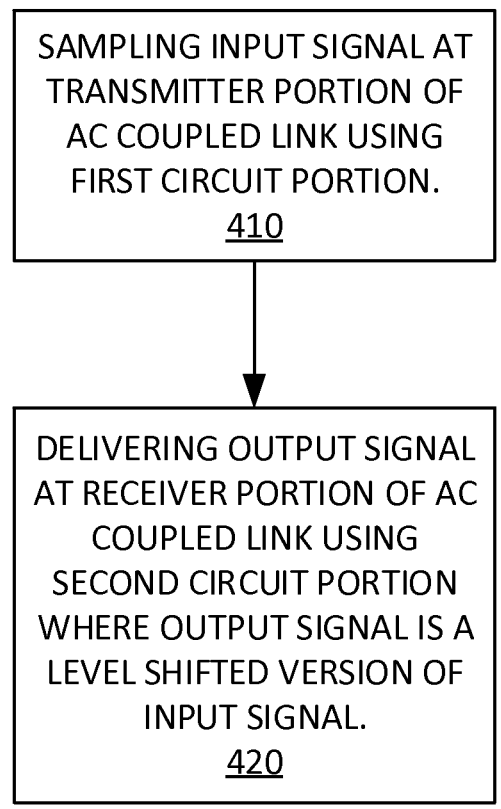
FIG. 4 illustrates a method for facilitating signal coupling across a high-pass filter of an AC coupled data link, for example for mitigating baseline wander associated therewith, in accordance with other embodiments of the present invention.

FIG. 4 illustrates a method for facilitating signal coupling across a high-pass filter of an AC coupled data link, for example for mitigating baseline wander associated with the AC coupled data link, in accordance with embodiments of the present invention. The AC coupled data link includes a high-pass filter separating a receiver portion of the AC coupled link from a transmitter portion of the AC coupled link. The method includes monitoring or sampling 410 an input signal at the transmitter portion using a first circuit portion. Sampling may include, for example, switchably coupling a sampling capacitor to the transmitter portion of the AC coupled link to collect and store charge therefrom. The method further includes delivering 420 an output signal at the receiver portion using a second circuit portion operatively coupled to the first circuit portion, the output signal corresponding to a level shifted version of the input signal. Delivering of the output signal may include, for example, switchably coupling one side of the sampling capacitor to the receiver portion of the AC coupled link concurrently with coupling the other side of the sampling capacitor to a reference voltage level in order to provide the level shift. In various embodiments the input signal and the output signal may be an input voltage and an output voltage, respectively. In some embodiments, the output voltage is related to the input voltage at least in part by the conveyance of charge to and from the sampling capacitor. Switchably coupling of the sampling capacitor to other circuitry portions as described above may include forming temporary couplings corresponding to temporary closure of one or more switches, such as CMOS switches. Such switches may be driven by appropriate clock signals so that the switch is opened again as the clock signals change, thereby providing for the temporary closure, which may be repeated periodically due to continued clock signal variation.

The technology will now be described with reference to specific examples. It will be understood that the following examples are intended to describe embodiments of the technology and are not intended to limit the technology in any way.

Figure 5:
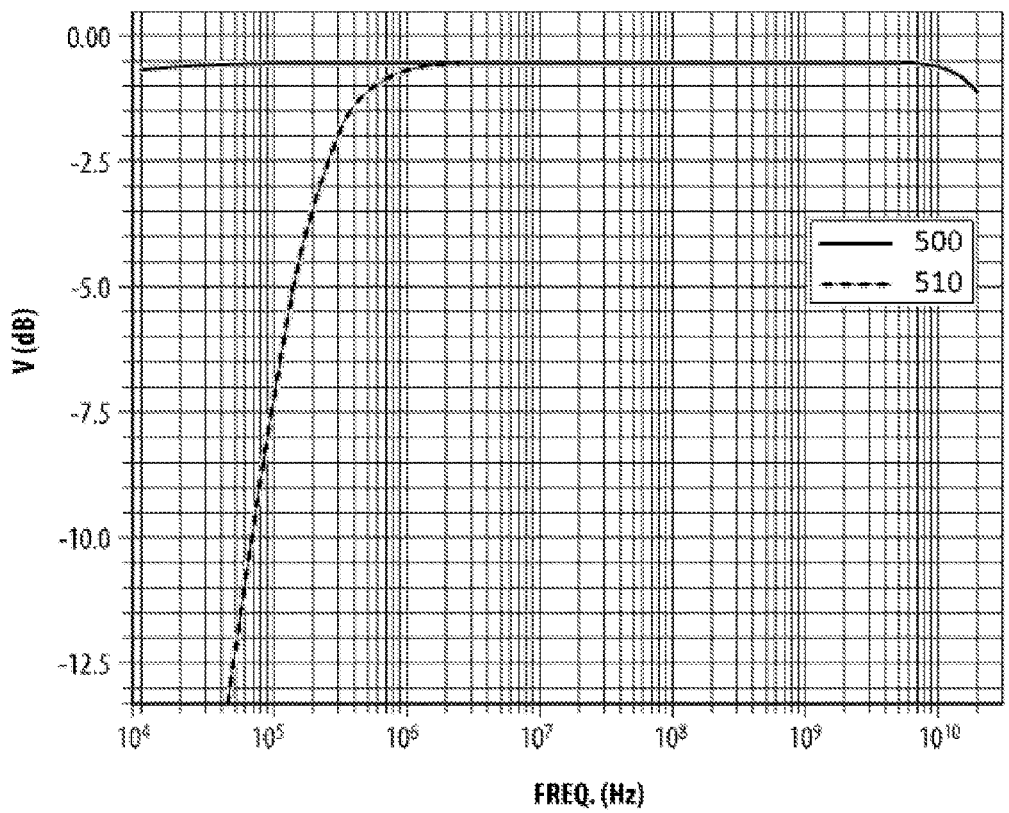
FIG. 5 illustrates a frequency response curve illustrating performance of an example embodiment of the present invention.

FIG. 5 illustrates a frequency response curve 500 in accordance with an example embodiment of the present invention employing a level-shifting switched capacitor circuit. The frequency response curve 500 is compared with the frequency response curve 510 of an alternative circuit which includes a 1 MΩ resistor instead of a level-shifting switched capacitor circuit. The level-shifting capacitor circuit used in this example is as illustrated for example in FIG. 2 and is further specified by the following parameters: The switching frequency is 10 MHz, the sampling capacitance is 10 fF, the AC coupling capacitance is 700 fF, and the bias voltage is 0.7V. As noted, the frequency response curve 510 cuts off frequencies below about 250 kHz, while the frequency response curve 500 passes frequencies significantly below this cutoff, and potentially down to DC.

Figure 6A:
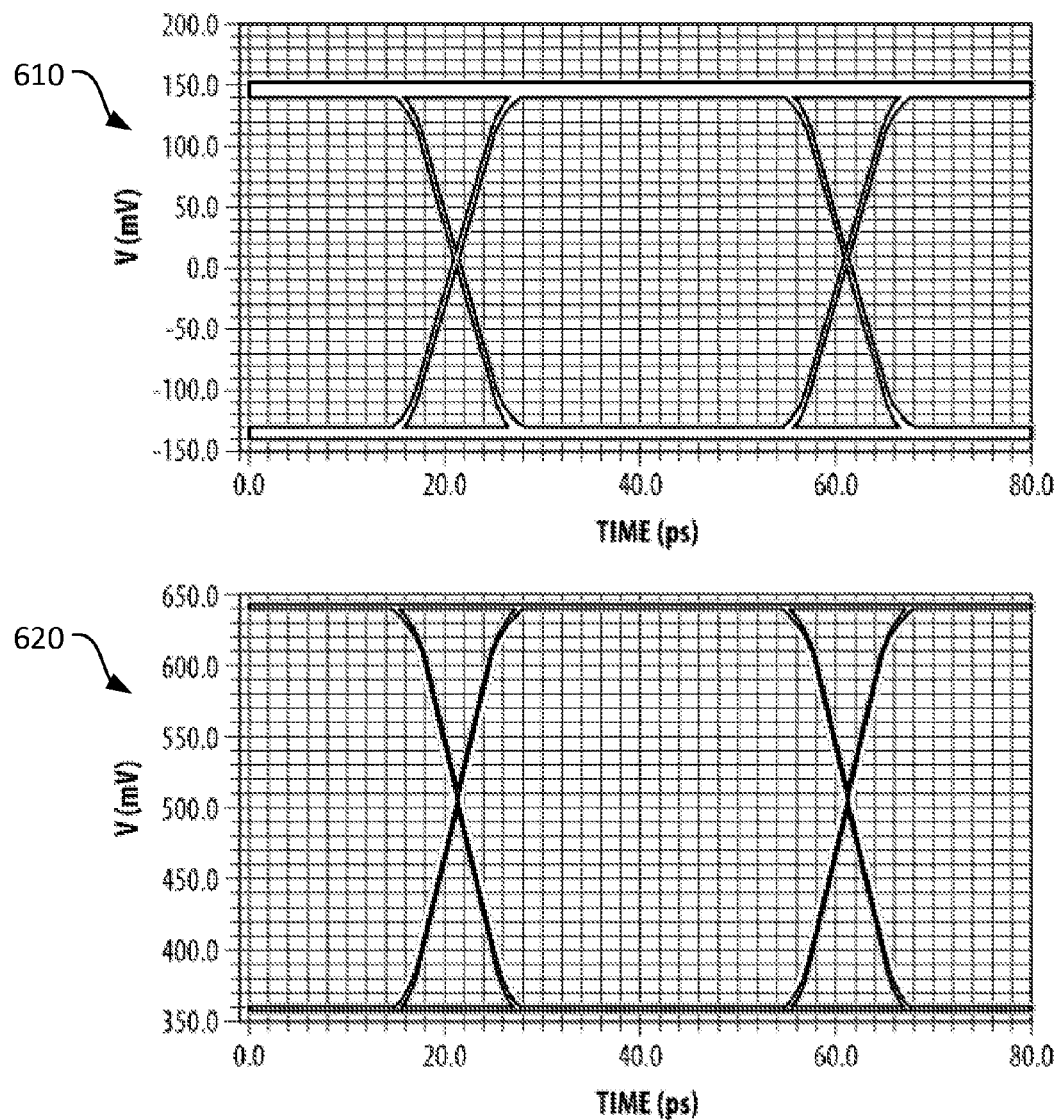
FIG. 6A illustrates eye diagrams illustrating performance of example embodiments of the present invention.

FIG. 6A illustrates a pair of eye diagrams illustrating performance according to an example embodiment of the present invention. A transmission line signal at 25 GB/s was provided, using pseudorandom binary sequence (PRBS) 31, and a 4 microsecond simulation time. The number of data bits in the eye diagram may therefore be about 4 microseconds/unit interval, where the unit interval of 25 Gb/s is 40 picoseconds. The bottom eye diagram 620 illustrates system performance when employing a level-shifting switched capacitor circuit with a 10 MHz clock. The top eye diagram 610 illustrates system performance of an alternate circuit which includes a 1 MΩ resistor instead of a level-shifting switched capacitor circuit. The input swing is 150 mV. As illustrated, the top eye diagram 610 exhibits about 9.35 mV of vertical noise, while the bottom eye diagram 620 exhibits about 2.04 mV of vertical noise. The level-shifting capacitor circuit used in this example is as illustrated for example in FIG. 2 and is further specified by the following parameters: The switching frequency is 10 MHz, the sampling capacitance is 10 fF, the AC coupling capacitance is 700 fF, and the bias voltage is 0.7V.

Figure 6B:
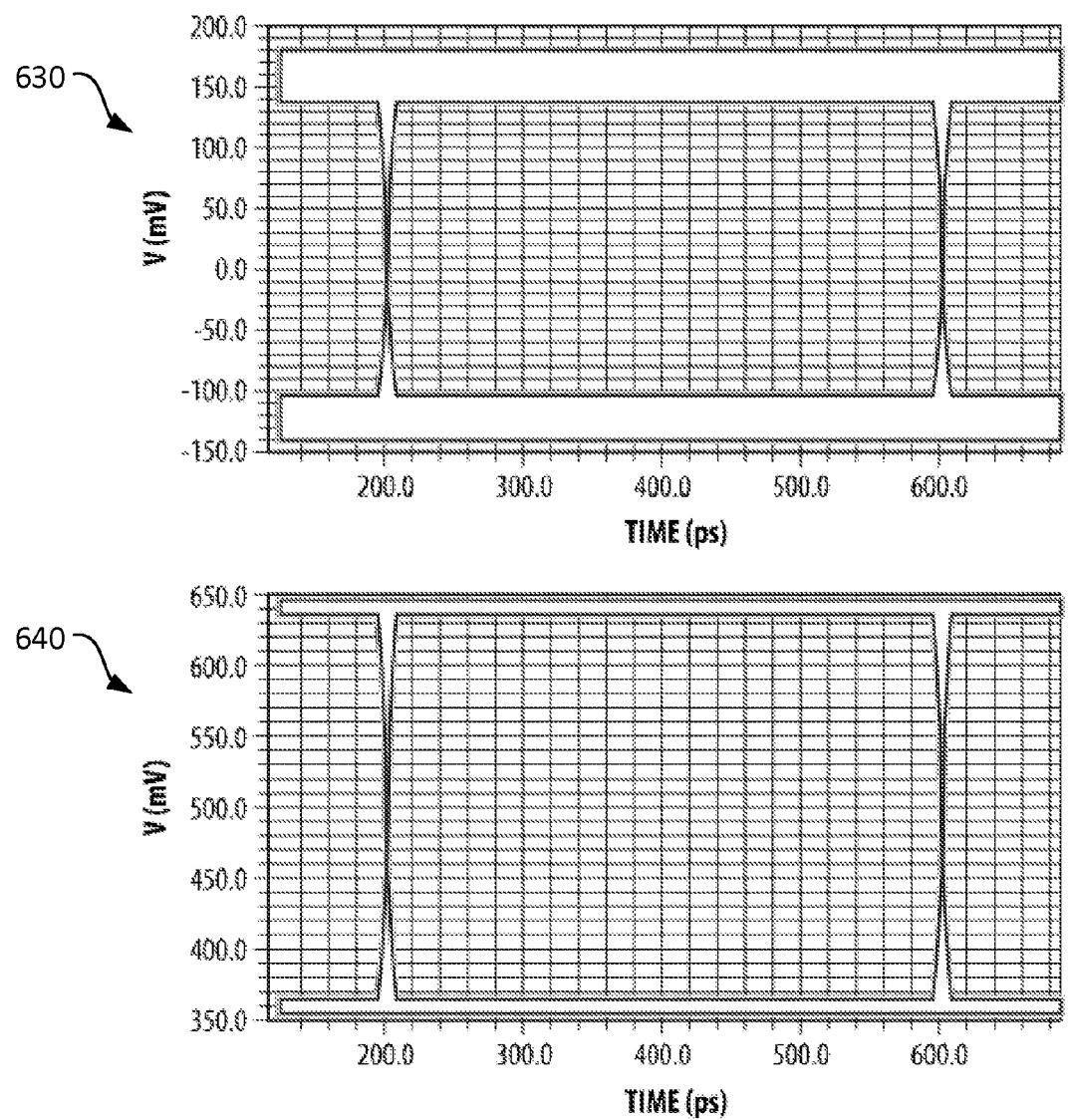
FIG. 6B illustrates eye diagrams illustrating performance of example embodiments of the present invention.

FIG. 6B illustrates a pair of eye diagrams illustrating performance according to an example embodiment of the present invention. A transmission line signal at 2.5 GB/s was provided, using pseudorandom binary sequence (PRBS) 31, and an 8 microsecond simulation time. The bottom eye diagram 640 illustrates system performance when employing a level-shifting switched capacitor circuit with a 10 MHz clock. The top eye diagram 630 illustrates system performance for an alternative circuit which includes a 1 MΩ resistor instead of a level-shifting switched capacitor circuit. The input swing is 150 mV. As illustrated, the top 630 eye diagram exhibits about 40 mV of vertical noise, while the bottom eye diagram 640 exhibits about 9.3 mV of vertical noise. The level-shifting capacitor circuit used in this example is as illustrated for example in FIG. 2 and is further specified by the following parameters: The switching frequency is 10 MHz, the sampling capacitance is 10 fF, the AC coupling capacitance is 700 fF, and the bias voltage is 0.7V.

Figure 7:
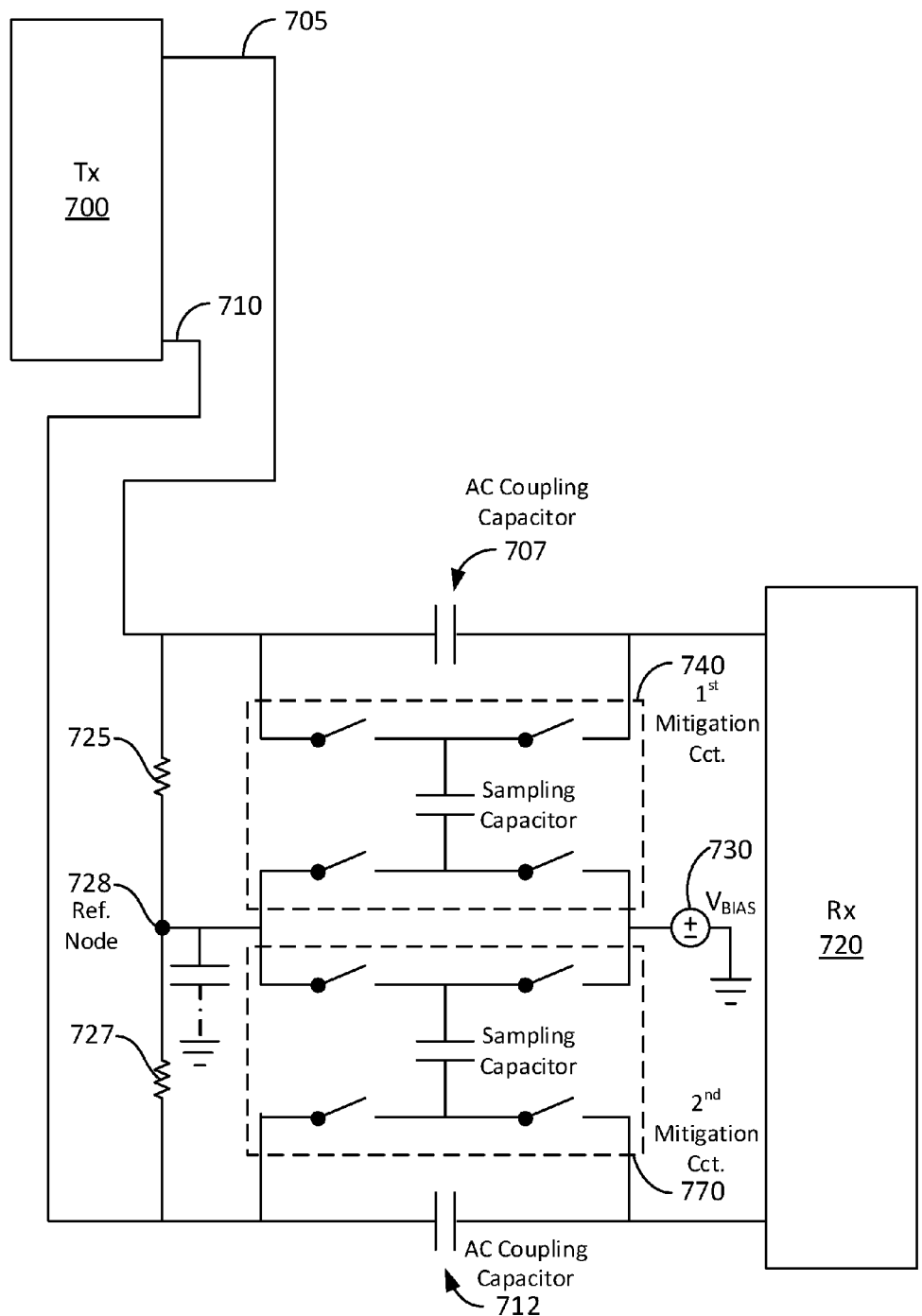
FIG. 7 illustrates a differential pair transmission line incorporating circuitry provided in accordance with embodiments of the present invention.

FIG. 7 illustrates a differential pair transmission line incorporating baseline wander mitigation provided in accordance with embodiments of the present invention. A transmitter 700 transmits a data signal as a differential pair, that is, via complementary signals transmitted on the two signal lines 705 and 710, as would be readily understood by a worker skilled in the art. The signal lines 705 and 710 are AC coupled to a differential receiver 720 via AC coupling capacitors 707 and 712, respectively. A pair of transmission line terminal resistors 725, 727, such as 50Ω resistors.

As illustrated, a first baseline wander mitigation circuit 740 is coupled across the first AC coupling capacitor 707 and a second baseline wander mitigation circuit 770 is coupled across the second AC coupling capacitor 712. The baseline wander mitigation circuits 740 and 770 are connected to a common reference node 728 located at a coupling point or centre tap of the two terminal resistors 725, 727. The baseline wander mitigation circuits 740 and 770 are also connected to a common source of bias voltage 730.

Figure 8:
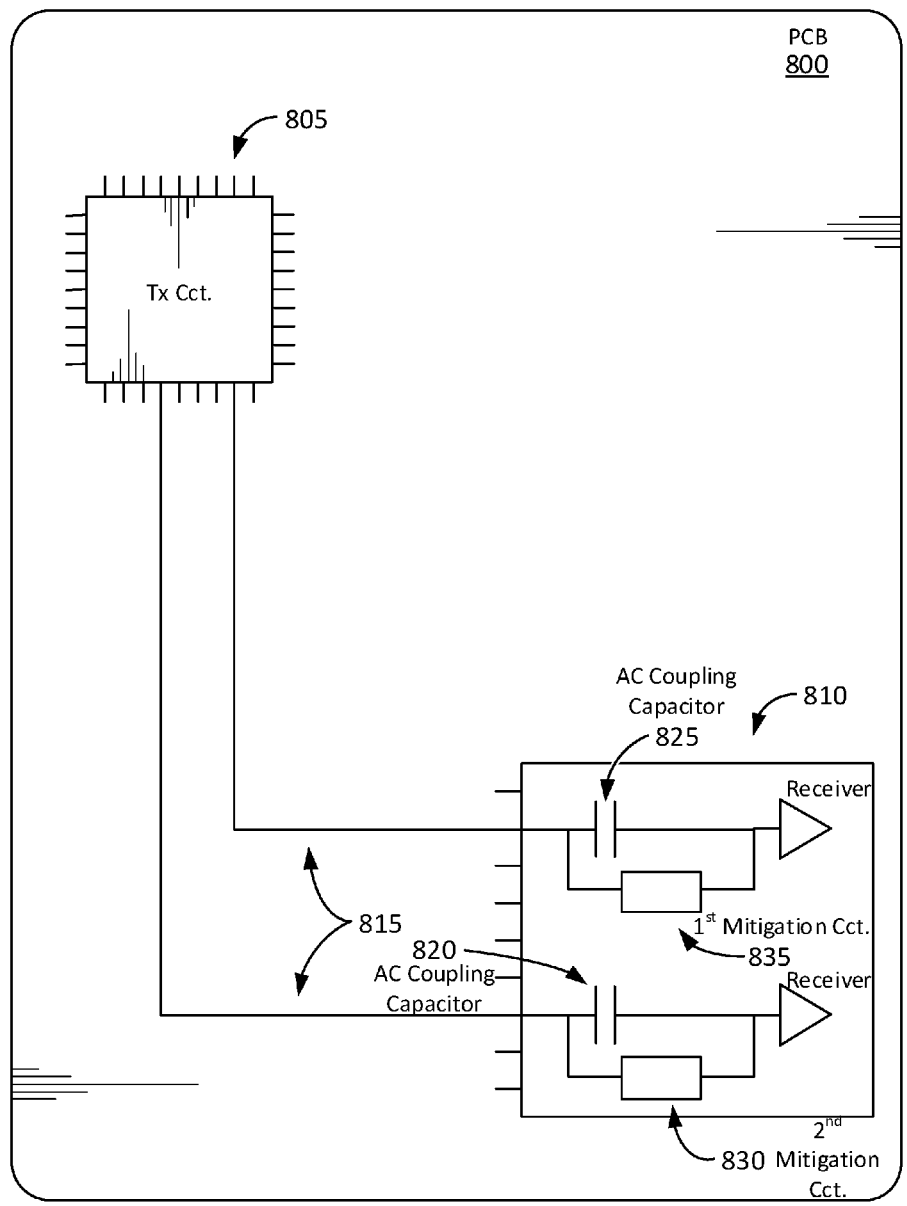
FIG. 8 illustrates an integrated circuit comprising an electronic circuit in accordance with embodiments of the present invention.

FIG. 8 illustrates an integrated circuit 810 comprising an electronic circuit for mitigating baseline wander in accordance with embodiments of the present invention. The integrated circuit 810 may be provided in a single microchip package or potentially in pre-packaged form as a semiconductor die or wafer comprising plural integrated circuits. The integrated circuit is operatively coupled to a transmission line 815, illustrated here as a differential transmission line, which may be coupled at a far end to a transmitter circuit 805 which is located on or off of a common printed circuit board 800. The integrated circuit 810 includes one or more on-chip AC coupling capacitors 820, 825, across which one or more circuits for mitigating baseline wander 830, 835 are connected. Such circuits are as described elsewhere herein. Although two AC coupling capacitors and circuits for mitigation of baseline wander are shown, some embodiments may include only a single AC coupling capacitor and circuit for mitigation of baseline wander if a single-ended transmission line is utilized. The integrated circuit may include various other functionalities, including signal reception, processing, and various other operations as would be readily understood by a worker skilled in the art. Clock signals for controlling pairs of synchronized switches included in the circuit for mitigation of baseline wander may be generated within the integrated circuit or externally to the integrated circuit. A discrete component version of the integrated circuit may also be provided. For example, in one alternative embodiment, the AC coupling capacitors 820, 825 may be provided off chip.

It is noted that the circuit as described herein may be adjusted in various ways. For example, the sampling capacitor circuit may include a single capacitor or a network of capacitors. As another example, multiple sampling capacitor circuits may be connected in series, with clock-driven switches coupling each sampling capacitor to the next, in order to transfer charge from input to output via a series of steps. As yet another example, separate switches, such as two switches connected on a common side of the sampling capacitor, may be integrated into a single-pole double-throw switch, which may be configured to introduce a guard time between switching events.

Although the present invention has been described with reference to specific features and embodiments thereof, it is evident that various modifications and combinations can be made thereto without departing from the invention. The specification and drawings are, accordingly, to be regarded simply as an illustration of the technology as defined by the appended claims, and are contemplated to cover any and all modifications, variations, combinations or equivalents that fall within the scope of the present invention.

I claim:

1. An electronic circuit apparatus comprising:
a first pair of synchronized switches configured to alternatingly open and close in response to a first clock signal variation;
a second pair of synchronized switches configured to alternatingly open and close in response to a second clock signal variation, wherein concurrent closure of the first pair of synchronized switches with the second pair of synchronized switches is inhibited; and
a sampling capacitor circuit configured to couple between a signal input and a reference node upon closure of the first pair of switches and the sampling capacitor circuit configured to couple between a source of bias voltage and a signal output upon closure of the second pair of switches.

2. The electronic circuit according to claim 1, wherein the electronic circuit is configured to be coupled across a high-pass filter associated with an Alternating Current (AC) coupled transmission line, the electronic circuit being operative to mitigate baseline wander of the AC coupled transmission line.

3. The electronic circuit according to claim 2, wherein the source of bias voltage is configured to provide a common mode voltage selected to facilitate performance of a receiver operatively coupled to the AC coupled transmission line.

4. The electronic circuit according to claim 1, wherein the first clock signal variation and the second clock signal variation are cooperatively configured to provide a guard time interval during which both the first and second pairs of synchronized switches remain open following opening of one of the first and second pairs of synchronized switches and both the first and second pairs of synchronized switches remain open prior to closure of another of the first and second pairs of synchronized switches.

5. The electronic circuit according to claim 1, wherein the first clock signal variation and the second clock signal variation are derived from a common clock signal or from separate clock signals.

6. An electronic circuit apparatus associated with an Alternating Current (AC) coupled data transmission line, comprising:
an input node and an output node configured to couple the apparatus in parallel with a high-pass filter of the AC coupled transmission line, wherein the input node is coupled to a signal input side of the high-pass filter and the output node is coupled to a signal output side of the high-pass filter;
a sampling circuit configured to sample an input voltage at the input node; and
a level-shifting output circuit configured to receive the sampled input voltage from the sampling circuit and to generate and deliver an output voltage at the output node, wherein the output voltage corresponds to a level shifted version of the input voltage,
the apparatus comprising a sampling capacitor switchably coupled to the input node during a first time interval and switchably coupled to the output node during a second time interval separate from the first time interval.

7. The electronic circuit apparatus of claim 6, wherein the sampling circuit comprises the sampling capacitor.

8. The electronic circuit apparatus of claim 7, wherein the level-shifting output circuit comprises the sampling capacitor switchably coupled in series with a bias voltage source upon coupling of the sampling capacitor to the output node.

9. The electronic circuit apparatus of claim 6, wherein the sampling circuit is configured to sample the input voltage at the input node relative to a reference voltage.

10. The electronic circuit apparatus of claim 6, wherein the sampling circuit is configured to sample the input voltage as a voltage difference between the input node and either an AC ground or a centre tap of a differential transmission line termination resistor pair.

11. The electronic circuit apparatus of claim 6, wherein the electronic circuit apparatus is provided within an integrated circuit apparatus configured for operative coupling to additional circuitry through use of the AC coupled data transmission line.

12. The electronic circuit apparatus of claim 11, wherein the high-pass filter is a capacitor provided internally to the integrated circuit apparatus.

13. A method for facilitating signal coupling across a high-pass filter of an Alternating Current (AC) coupled data link, the high-pass filter separating a receiver portion of the AC coupled link from a transmitter portion of the AC coupled link, the method comprising:
  sampling an input voltage at an input node located on a signal input side of the high-pass filter using a sampling circuit, wherein sampling the input voltage comprises switchably coupling a sampling capacitor between the input node and a reference node during a first time interval, using a first pair of synchronized switches;
  receiving, by a level-shifting output circuit, the sampled input voltage from the sampling circuit; and
  delivering an output voltage to an output node located on a signal output side of the high-pass filter using the level-shifting output circuit, the output voltage corresponding to a level shifted version of the input voltage, wherein receiving the sampled input voltage and delivering the output voltage comprises switchably coupling the sampling capacitor between a source of bias voltage and the output node during a second time interval separate from the first time interval, using a second pair of synchronized switches.

14. The method according to claim 13, wherein sampling the input voltage comprises forming a first temporary coupling between a first terminal of the sampling capacitor and the input node and between a second terminal of the sampling capacitor and the reference node, the reference node being at a reference voltage, the sampling capacitor configured to exhibit and hold the input voltage therein upon the first temporary coupling.

15. The method of claim 14, wherein delivering the output voltage at the receiver portion comprises forming a second temporary coupling between the first terminal of the sampling capacitor and the output node and between the second terminal of the sampling capacitor and the source of bias voltage, wherein the second temporary coupling is formed after severance of the first temporary coupling.

16. The method of claim 13, wherein sampling the input voltage and receiving by the level-shifting output circuit and delivering the output voltage occur repeatedly at a predetermined frequency.

17. The method of claim 16, wherein a charge corresponding to the sampled input voltage is stored using the sampling capacitor, and wherein one or both of a capacitance C of the sampling capacitor and the predetermined frequency f are selected such that $1/(Cf) > 10$ MΩ.

18. The method of claim 13, wherein the output voltage is related to the input voltage at least in part by conveyance of charge via the sampling capacitor alternatingly coupled to the sampling circuit and the level shifting output circuit.

19. The method of claim 18, wherein both opposing terminals of the sampling capacitor are coupled to portion sampling circuit during the first time interval and to the level-shifting output circuit during the second time interval.

20. A method for mitigating baseline wander of an Alternating Current (AC) coupled transmission line, comprising:
  alternatingly opening and closing a first pair of synchronized switches in response to a first clock signal variation;
  alternatingly opening and closing a second pair of synchronized switches in response to a second clock signal variation, wherein concurrent closure of the first pair of synchronized switches with the second pair of synchronized switches is inhibited;
  coupling a sampling capacitor circuit between a signal input and a reference node by closure of the first pair of switches to sample the input voltage, the signal input located on a signal input side of a high-pass filter of the AC coupled transmission line; and
  coupling the sampling capacitor circuit between a source of bias voltage and a signal output by closure of the second pair of switches to provide the output voltage, the signal output located on a signal output side of the high-pass filter.

21. The method according to claim 20, wherein the source of bias voltage is configured to provide a common mode voltage selected to facilitate performance of a receiver operatively coupled to the AC coupled transmission line.

22. The method according to claim 20, wherein the first clock signal variation and the second clock signal variation are cooperatively configured to provide a guard time interval during which both the first and second pairs of synchronized switches remain open following opening of one of the first and second pairs of synchronized switches and both the first and second pairs of synchronized switches remain open prior to closure of another of the first and second pairs of synchronized switches.

* * * * *

UNITED STATES PATENT AND TRADEMARK OFFICE
CERTIFICATE OF CORRECTION

PATENT NO.        : 9,503,251 B2                                Page 1 of 1
APPLICATION NO.   : 14/603605
DATED             : November 22, 2016
INVENTOR(S)       : Euhan Chong It is certified that error appears in the above-identified patent and that said Letters Patent is hereby corrected as shown below:

In the Claims

Column 14, Line 8, "terminals of the sampling capacitor are coupled to portion" should read
--terminals of the sampling capacitor are coupled to the--.

Signed and Sealed this
Seventh Day of February, 2017

Michelle K. Lee
*Director of the United States Patent and Trademark Office*